No. 764,525. PATENTED JULY 5, 1904.
A. D. EZZELL.
PLANTER.
APPLICATION FILED OCT. 15, 1903.
NO MODEL.
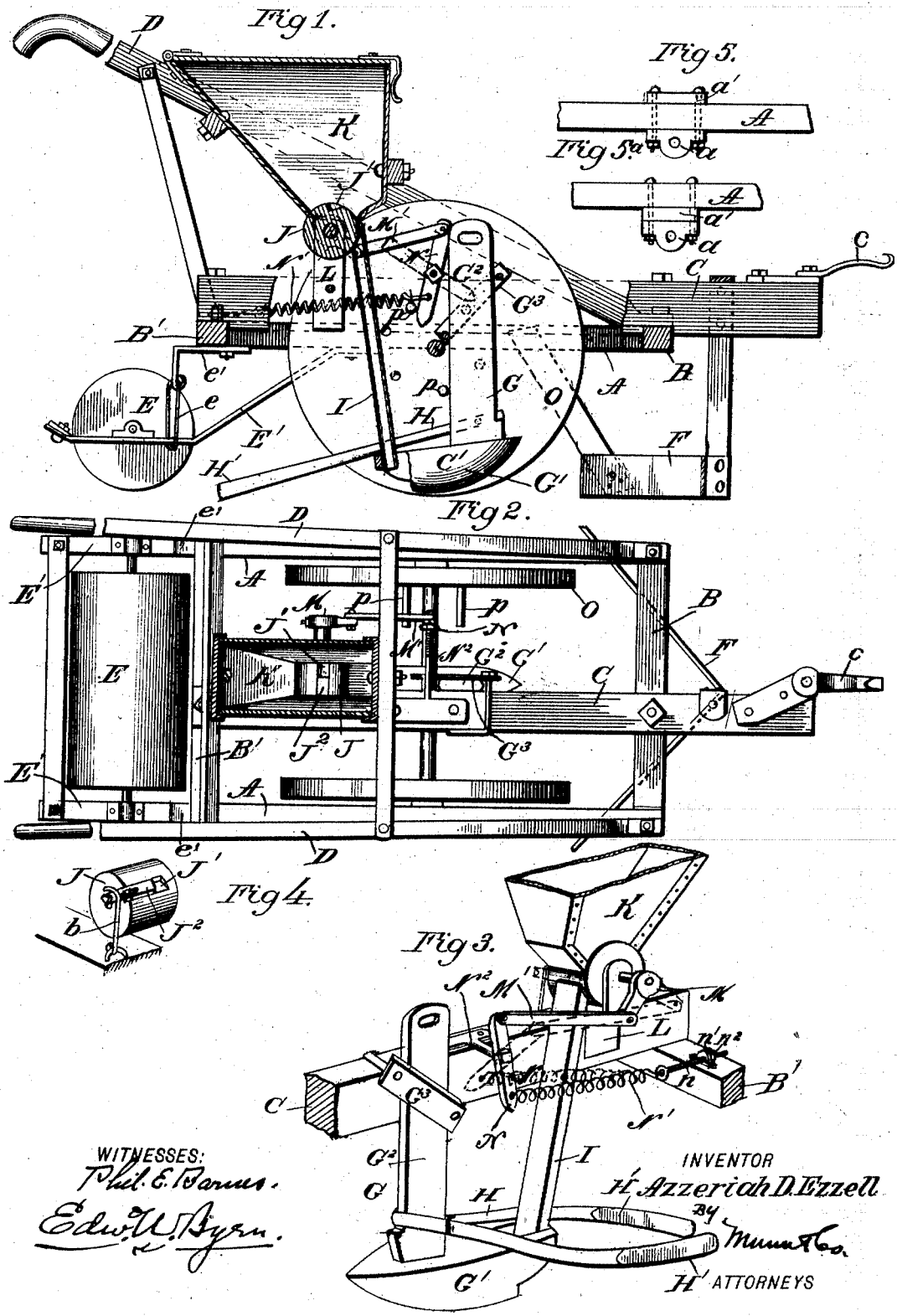
WITNESSES:
Phil. E. Barnes.
Edw. W. Byrn.
INVENTOR
H. Azzeriah D. Ezzell
BY
Munn & Co.
ATTORNEYS No. 764,525.

Patented July 5, 1904.

UNITED STATES PATENT OFFICE.

AZZERIAH D. EZZELL, OF CLINTON, NORTH CAROLINA.

PLANTER.

SPECIFICATION forming part of Letters Patent No. 764,525, dated July 5, 1904.

Application filed October 15, 1903. Serial No. 177,144. (No model.)

*To all whom it may concern:*

Be it known that I, AZZERIAH D. EZZELL, a citizen of the United States, residing at Clinton, in the county of Sampson and State of North Carolina, have invented a new and useful Improvement in Planters, of which the following is a specification.

My invention is an improvement in planters; and it consists in certain novel constructions and combinations of parts, as will be hereinafter described and claimed.

In the drawings, Figure 1 is a vertical longitudinal section of a planter embodying my invention. Fig. 2 is a top plan view, partly in section. Fig. 3 is a detail perspective view illustrating the beam, the seedbox, the dropping-cylinder, the opener, and the parts immediately associated therewith. Fig. 4 is a detail view of the dropping-cylinder or rocker, and Figs. 5 and $5^a$ are details of the bearings of the supporting-wheel shaft.

In carrying out my invention I employ a suitable rectangular framing having the side beams A, the front and rear cross-beams B B', and the main or draft beam C, secured to the front and rear beams of the main frame a little to one side of the middle longitudinal line and having at its front end a draft attachment $c$ for the connection of the team. This draft attachment is offset so as to come in the middle longitudinal line. Handles D are provided at the rear of the main frame, and a roller E, carried by spring-arms E', is arranged in rear of the main frame and has its spring-arms secured to the side bars of the main frame, as shown. The up-and-down movement of the roller is restrained within certain limits by loops or links $e$, inclosing the spring-arms E' and supported by hangers $e'$ from the rear of the frame.

At the front of the frame I provide a scraper or track-clearer F, which clears the track for the opener G, which opener has a shoe G', (to open the furrow for the seed,) supported by a standard $G^2$, held by a clip $G^3$ to the draft-beam, so the opener may be raised and lowered, as desired. A coverer H is made of a metal piece bent around and secured to the standard $G^2$ and extends rearwardly beyond the seed-tube in two branches, which have at their rear ends inwardly-deflected portions H', which cover the seed deposited by the tube I in the operation of the machine. The tube I is secured to the main or draft beam in rear of the standard and discharges at its lower end to the rear portion of the shoe through an opening therein, as shown in Figs. 1 and 3.

At its upper end the seed-tube is arranged to receive the seed discharged by the rocking seed dropper or cylinder J. This cylinder J operates in the lower portion of the seedbox K and has an opening or pocket J', whose size can be regulated by the slide $J^2$, Fig. 4, and which is so arranged as to deliver seed to the upper end of the seed-tube when the rocker is tilted forward by the operation of the devices presently described. This rocker or cylinder is journaled in suitable supports L and is provided at one end with a crank-arm M, Fig. 3, connected by the forwardly-extending pitman M' with a lever N. This lever is pivoted between its ends upon the end of an arm $N^2$, projecting from the draft-beam, and said lever is arranged at one end to be operated in one direction by a spring N' and in the other direction by a pin or pins $p$ on one of the wheels O of the planter, which are located in front of and below the seed-hopper. As this lever N is rocked on its pivot it causes the seed-discharging rocker to tilt forward to position to discharge the seed into the tube I, whence they pass into the ground, are covered by the covering-arms H' H', and are then rolled by the roller in the rear of the machine.

If the spring N' should become slack or too weak in tension, it may have its tension increased by an adjusting-screw $n$, which passes through an eye $n'$ on the frame and is provided with an adjustable nut $n^2$ behind the same.

For transporting the planter from field to field the seeding devices must be rendered inoperative, and for this purpose the seeding-cylinder is turned forward and a hook $b$ (see Fig. 4) is hooked over the slide $J^2$ or some other part of the cylinder. This throws the lever N into the dotted position in Figs. 1 and 3, in which the pins $p$ do not strike it.

All of the operative parts of the seeding devices, it will be seen, are located on the side of the draft-beam between it and the more remote of the two supporting-wheels.

By my invention corn, cotton, peas, &c., may be conveniently planted in rows, and the quantity of seed planted is regulated by means of the slide in the charger or rocking dropper, and the distance apart of the hills planted may be regulated by the projections or pins on the wheel, as the pins may be increased or decreased in number, as desired. The wheels of the planter are to be in two sizes, fourteen and sixteen inches in diameter. With a fourteen-inch wheel when one pin is used on the wheel seeds will be planted forty-two inches apart. When two pins are used equidistant apart, the hills will be twenty-one inches apart, and when three pins equidistant are employed the hills will be fourteen inches apart.

In fixing the centers of the two sizes of wheel I provide a block $a'$. (See Figs. 5 and $5^a$.) With the sixteen-inch wheel the block is above the side bar A, as seen in Fig. 5. With a fourteen-inch wheel this block $a'$ is placed below the side bar A and between it and the box $a$ for the shaft, the block and the journal-box being secured by the same set of bolts. The depth of the opener can be regulated by means of the clip $G^3$.

Having thus described my invention, what I claim as new, and desire to secure by Letters Patent, is—

1. A planter comprising a rectangular framework with a middle draft-beam, a seedbox mounted in elevated position on the rear of the framework, an oscillating seed-cylinder with seed-cavity on its periphery arranged at the bottom of the seedbox and having a crank at its end, a connecting-rod attached thereto and extending forwardly, a lever attached to the connecting-rod and fulcrumed between its ends on the middle draft-beam, a supporting-wheel with laterally-projecting pins arranged in front of and below the seedbox and operating on the lever, and a spring for retracting the lever substantially as shown and described.

2. A planter comprising a rectangular framework with a middle draft-beam, a seedbox mounted in elevated position on the rear of the framework, an oscillating seed-cylinder with seed-cavity on its periphery arranged at the bottom of the seedbox and having a crank at its end, a connecting-rod attached thereto and extending forwardly, a lever attached to the connecting-rod and fulcrumed between its ends on the middle draft-beam, a supporting-wheel with laterally-projecting pins arranged in front of and below the seedbox and operating on the lever, a spring for retracting the lever, an upright standard secured to the middle draft-beam and having a shoe at its lower end, and a hollow conductor in rear of the standard and leading from the seed-cylinder to the shoe substantially as shown and described.

3. A planter comprising a rectangular framework with a middle draft-beam, a seedbox mounted in elevated position on the rear of the framework, an oscillating seed-cylinder with seed-cavity on its periphery arranged at the bottom of the seedbox and having a crank on its end, a connecting-rod attached thereto and extending forwardly, a lever attached to the connecting-rod and fulcrumed between its ends on the middle draft-beam, a supporting-wheel with laterally-projecting pins arranged in front of and below the seedbox and operating on the lever, a spring for retracting the lever, and a locking device mounted on the frame and engaging with the seeding-cylinder when rocked against the tension of the spring to hold the lever out of range of contact with the pins on the supporting-wheel, substantially as described.

4. A planter, comprising a framework, a transverse shaft bearing two supporting-wheels and journaled in the frame, a draft-beam attached to the frame at one side of the middle longitudinal line and bearing a draft attachment offset into the middle longitudinal line, and seeding devices arranged between the draft-beam and the more remote one of the wheels, said seeding devices consisting of a standard with opener-shoe and coverer, a seedbox with oscillating cylinder, and operative mechanism between the supporting-wheels and the seedbox, substantially as described.

AZZERIAH D. EZZELL.

Witnesses:
GILES A. CLERTE,
WILLIAM B. STEWART.